United States Patent
Warren et al.

(10) Patent No.: US 11,961,096 B2
(45) Date of Patent: *Apr. 16, 2024

(54) DEVICE REQUIREMENT AND CONFIGURATION ANALYSIS

(71) Applicant: Capital One Services, LLC, McLean, VA (US)

(72) Inventors: David Spencer Warren, Richmond, VA (US); Daniel Lantz, Richmond, VA (US); Ricky Su, Richmond, VA (US); Shannon Hsu, Richmond, VA (US); Scott Anderson, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,038

(22) Filed: Apr. 28, 2023

(65) Prior Publication Data
US 2023/0298049 A1    Sep. 21, 2023

Related U.S. Application Data

(63) Continuation of application No. 16/856,655, filed on Apr. 23, 2020, now Pat. No. 11,663,611.

(51) Int. Cl.
*G06Q 30/018*    (2023.01)
*G06F 40/30*    (2020.01)
(Continued)

(52) U.S. Cl.
CPC ......... *G06Q 30/0185* (2013.01); *G06F 40/30* (2020.01); *G06Q 10/105* (2013.01); *G06Q 50/18* (2013.01); *G06Q 50/26* (2013.01)

(58) Field of Classification Search
CPC .. G06Q 30/0185; G06Q 10/105; G06Q 50/18; G06Q 50/26; G06F 40/30; G06F 40/211; G06F 40/284; G06F 40/56
See application file for complete search history.

(56) References Cited

U.S. PATENT DOCUMENTS

| 2005/0228874 A1* | 10/2005 | Edgett | H04L 63/104 |
| | | | 709/220 |
| 2006/0062383 A1* | 3/2006 | Kaneda | G06F 21/805 |
| | | | 713/193 |

(Continued)

FOREIGN PATENT DOCUMENTS

CN    107909998 A  *  4/2018  ........... G06F 40/284

OTHER PUBLICATIONS

Falessi, D., Cantone, G., & Canfora, G. (2010, September). A comprehensive characterization of NLP techniques for identifying equivalent requirements. In Proceedings of the 2010 ACM-IEEE international symposium on empirical software engineering and measur (Year: 2010).*

(Continued)

*Primary Examiner* — Michelle M Koeth
*Assistant Examiner* — Philip H Lam
(74) *Attorney, Agent, or Firm* — Banner & Witcoff, Ltd.

(57) ABSTRACT

Systems, methods, and apparatuses are described for determining compliance with a plurality of restrictions associated with one or more devices in an organization. First text indicating restrictions may be received, and second text indicating a current configuration of one or more devices may be received. Both sets of text may be processed by, e.g., removing a portion of the text based on a predetermined list of terms and simplifying the text using a lemmatization algorithm. A first vector and second vector may be generated based on the processed sets of text, and each vector may be weighted based on an inverse frequency of words in their respective text. Each vector may be normalized based on semantic analysis. The two vectors may be compared. Based on the comparison, third text corresponding to a portion of the second vector may be generated and transmitted to a third computing device.

20 Claims, 6 Drawing Sheets

| Terms from Requirements Text (601) | First Vector (602) | Second Vector (603) | Results Vector (604) |
|---|---|---|---|
| SERVER A | 1 | 1 | 1 |
| ENCRYPT | 1 | 1 | 1 |
| USER DATA | 1 | 1 | 1 |
| MD5 | 1 | 0 | 0 |
| WHEN RECEIVED | 1 | 0 | 0 |
| DELETE | 1 | 1 | 1 |
| AFTER | 1 | 1 | 1 |
| TEN WEEKS | 1 | 1 | 1 |

(51) Int. Cl.
G06Q 10/105 (2023.01)
G06Q 50/18 (2012.01)
G06Q 50/26 (2012.01)

(56) References Cited

U.S. PATENT DOCUMENTS

| | | | | |
|---|---|---|---|---|
| 2012/0102543 | A1* | 4/2012 | Kohli | H04L 63/20 726/1 |
| 2019/0190958 | A1* | 6/2019 | Blitz | H04L 63/20 |
| 2019/0327141 | A1* | 10/2019 | Ganesan | H04L 41/084 |
| 2019/0354881 | A1* | 11/2019 | Rosler | G06N 20/00 |
| 2020/0193058 | A1* | 6/2020 | Vaidhyanathan | G06F 21/552 |
| 2020/0410997 | A1 | 12/2020 | Bar-On et al. | |
| 2021/0089667 | A1 | 3/2021 | Kadiyala et al. | |
| 2021/0294797 | A1* | 9/2021 | Gupta | G06N 20/00 |

OTHER PUBLICATIONS

Arora, C., Sabetzadeh, M., Briand, L., & Zimmer, F. (2015). Automated checking of conformance to requirements templates using natural language processing. IEEE transactions on Software Engineering, 41(10), 944-968. (Year: 2015).*

Molino, Piero, et al., "COTA: Improving the Speed and Accuracy of Customer Support through Ranking and Deep Networks," submitted Jul. 3, 2018, arXiv:1807.13337 [cs.LG], pp. 1-9.

Falessi, D. et al., "A Comprehensive Characterization of NLP Techniques for Identifying Equivalent Requirements" In Proceedings of the 2010 ACM-IEEE international symposium of empirical software engineering and measurement, year 2010, pp. 1-10.

Molino. P., et al. "Cota: Improving the Speed and Accuracy of Customer Support Through Ranking and Deep Networks" In Proceedings of the 24th ACM SIGKDD International Conference of Knowledge Discovery & Data Mining, Year 2018, pp. 586-595.

Arora, C., et al. "Automated Checking of Conformance to Requirements Templates Using Natural Language Processing" IEEE Transactions on Software Engineering, 41 (10), Year 2015, pp. 944-968.

Mhatre, M. et al., "Dimensionality Reduction for Sentiment Analysis Using Pre-Processing Techniques" In 2017 International Conference on Computing Methodolgies and Communicaiton (ICCMC), Year 2017, pp. 16-21.

Ferrari, A. et al., "Mining Commonalities and Variables from Natural Language Documents" In Proceedings of the 17th International Software Product Line Conference, Year 2013, pp. 116-120.

* cited by examiner

DEVICE REQUIREMENT AND CONFIGURATION ANALYSIS

CROSS REFERENCE TO RELATED APPLICATIONS

This application is a continuation of U.S. patent application Ser. No. 16/856,655 filed Apr. 23, 2020, titled Device Requirement and Configuration Analysis. The contents of the above listed application is expressly incorporated herein by reference in its entirety for any and all non-limiting purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to analyzing device requirements and configurations, and more specifically to analyzing text associated with system requirements, system configurations, and the like.

BACKGROUND

Organizations, particularly large, multi-state and multi-national organizations, may be subject to a wide variety and number of restrictions. For example, each state may have different policies on data security, meaning that an organization must ensure that its devices comply with all such policies to operate in different states. But such restrictions can be exceedingly lengthy, convoluted, and may be frequently updated, such that the restrictions may require excessive manual review. Conventional search functions are ill-equipped to handle such restrictions, in part because the restrictions may be written differently and because such restrictions may comprise a significant amount of non-substantive language.

Aspects described herein may address these and other problems, and generally improve the ability to compare device requirements and current device configurations.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

A computing device may receive, from at least one external database, requirements data comprising first text that indicates a plurality of restrictions associated with one or more devices of an organization. The computing device may determine second text, which may indicate a current configuration of the organization, which may indicate a current configuration of the one or more devices of the organization. The computing device may remove, from the first text and by comparing the text with a predetermined list of terms, a portion of the first text. The computing device may process, using a lemmatization algorithm, the first text to generate simplified text, and generate, based on that simplified text, a first vector corresponding to one or more terms in the simplified text. The computing device may also determine a frequency of use of terms in the simplified text and may weight, based on that frequency, elements of the first vector. The first vector may be normalized based on a semantic analysis of the simplified text. The computing device may perform the same or similar steps to generate a second vector from the second text. The first vector and second vector may be compared, and a portion of the second vector may be determined based on that comparison. Third text may be based on the portion of the second vector, and the third text may be transmitted to a second computing device. The third text may be transmitted to the second computing device based on a quantity of elements of the portion of the second vector satisfying a threshold. These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
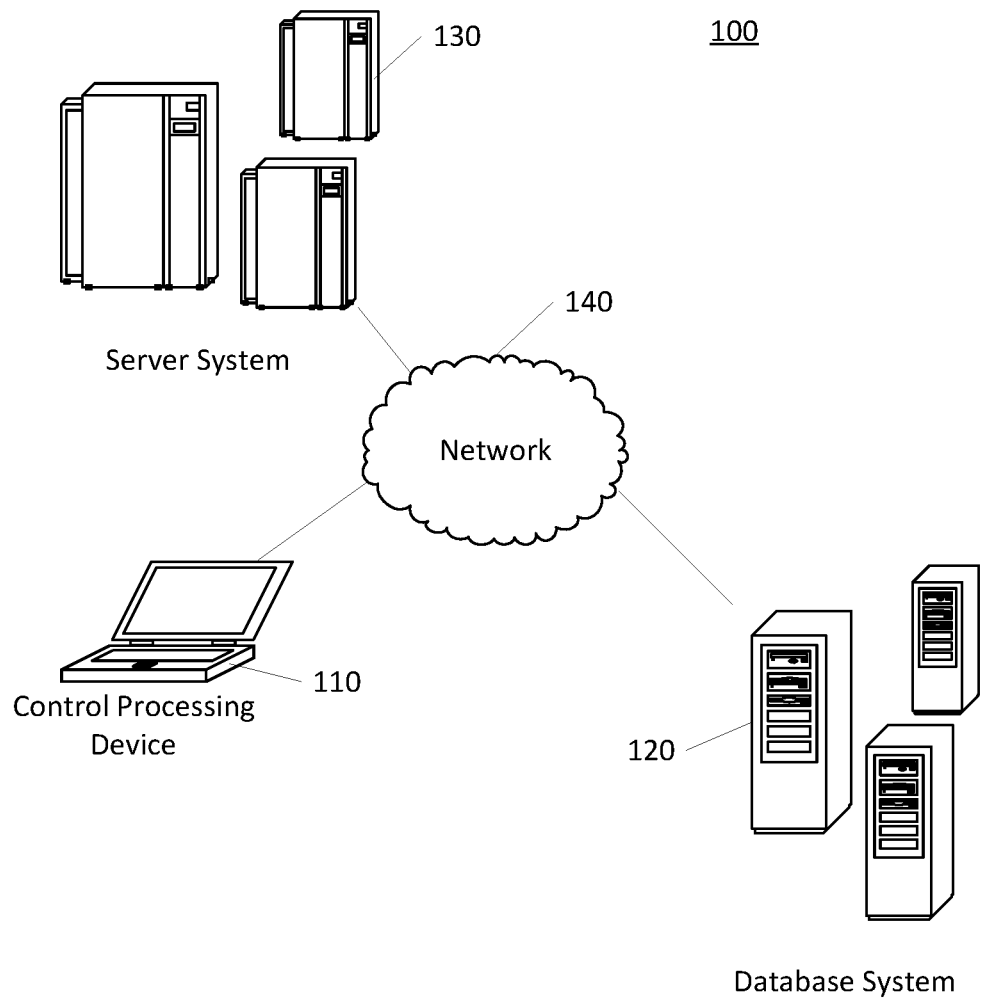
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for searching and determining correlations between device requirements and current device configurations. For example, methods and techniques discussed herein may be used to determine whether existing devices comply with a wide variety of different data security requirements applicable to those devices.

A computing device may receive, from at least one external database, requirements data comprising text that indicates a plurality of restrictions associated with one or more devices of an organization. Such text may indicate, for example, that a device must store data in a particular manner, whether or not certain types of data may be stored by a device, or the like. The computing device may determine second text, which may indicate a current configuration of the organization, which may indicate a current configuration of the one or more devices of the organization. For example, the second text may indicate how the one or more devices of the organization store data. The computing device may remove, from the text and by comparing the text with a predetermined list of terms (e.g., stop words, words known to be associated with structural elements of a legal document), a portion of the text. The computing device may process, using a lemmatization algorithm, the text to generate simplified text, and generate, based on that simplified text, a first vector corresponding to one or more terms in the simplified text. The lemmatization algorithm may be configured to remove one or more characters from one or more terms in the text. Some elements in the first vector may correspond to terms in the text and/or simplified text, whereas other elements in the vector may correspond to phrases (e.g., multiple terms) in the text and/or simplified text. The computing device may also determine a frequency of use of each term in the simplified text, and weight, based on that frequency (e.g., based on the inverse frequency), each element of the first vector. The first vector may be normalized based on a semantic analysis of the simplified text. The semantic analysis may comprise removing one or more portions of the first vector. The computing device may remove, from the second text and by comparing the second text with the predetermined list of terms, a portion of the second text. The computing device may process, using the lemmatization algorithm, the second text to generate simplified second text, and generate, based on that simplified second text, a second vector corresponding to one or more terms in the simplified second text. The computing device may also determine a frequency of use of each term in the simplified second text, and weight, based on that frequency, each element of the second vector. The second vector may be normalized based on a semantic analysis of the simplified second text. The first vector and second vector may be compared, and a portion of the second vector may be determined based on that comparison. Comparing the first vector and second vector may comprise generating a third vector, wherein each element in the third vector indicates the absence or presence of a different term. Third text may be based on the portion of the second vector, and the third text may be transmitted to a second computing device. The third text may be transmitted to the second computing device based on a quantity of elements of the portion of the second vector satisfying a threshold. The third text may indicate that the one or more devices of the organization are out of compliance. Transmitting the third text to the second computing device may comprise transmitting instructions configured to cause the one or more devices of the organization to comply with at least one of the plurality of restrictions.

Systems and methods according to this application improve the functioning of computers by improving the ability of computers to process and search external requirements and to determine differences between current device configurations and those external requirements. Legal and contractual requirements (e.g., data security laws) may vary from jurisdiction to jurisdiction, and may change rapidly. It is desirable to computer-implement at least a portion of compliance with these requirements, particularly given that such requirements can be exceedingly lengthy and convoluted. That said, conventional computer searching techniques (e.g., keyword searches) are ill-equipped to handle such requirements: not only do such searching techniques place an undue emphasis on unrelated portions of requirements text (e.g., low-substance legal terms, such as "article" or "chapter"), but such techniques are not equipped to search based on existing device configurations. In other words, the volume and complexity of the searched content, in conjunction with the volume and complexity of the devices themselves, renders search functions of low utility and high imprecision. As a result, even with conventional searching technology, extensive manual labor is required to filter and review computing device search results.

FIG. 1 shows a system 100. The system 100 may include at least one control processing device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Devices, such as the control processing device 110, may perform many of the steps described herein relating to processing text, generating vectors, and the like. Database systems 120 may similarly store and/or process text, generate vectors, and other steps as described herein. Databases may include, but are not limited to relational databases, hierarchical databases, distributed databases, in-memory databases, flat file databases, XML databases, NoSQL databases, graph databases, and/or a combination thereof. Server systems, such as the server system 130, may also process text, generate vectors, and other steps as described herein. The network 140 may include a local area network (LAN), a wide area network (WAN), a wireless telecommunications network, and/or any other communication network or combination thereof.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
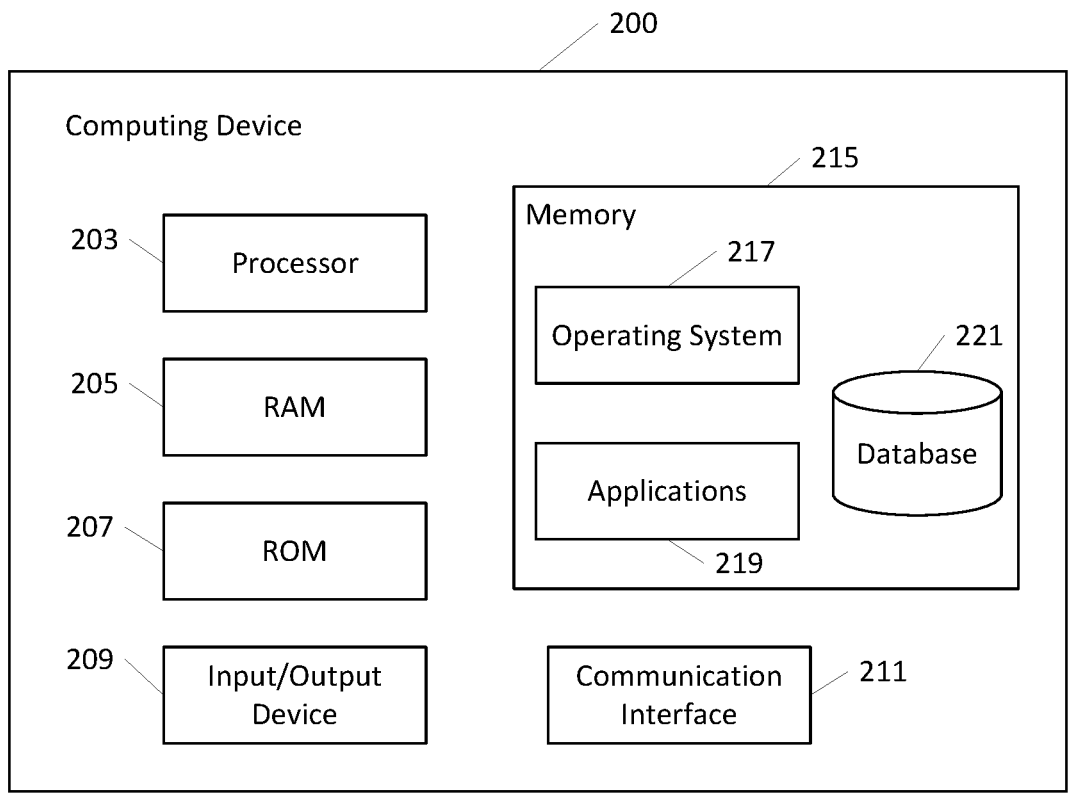
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
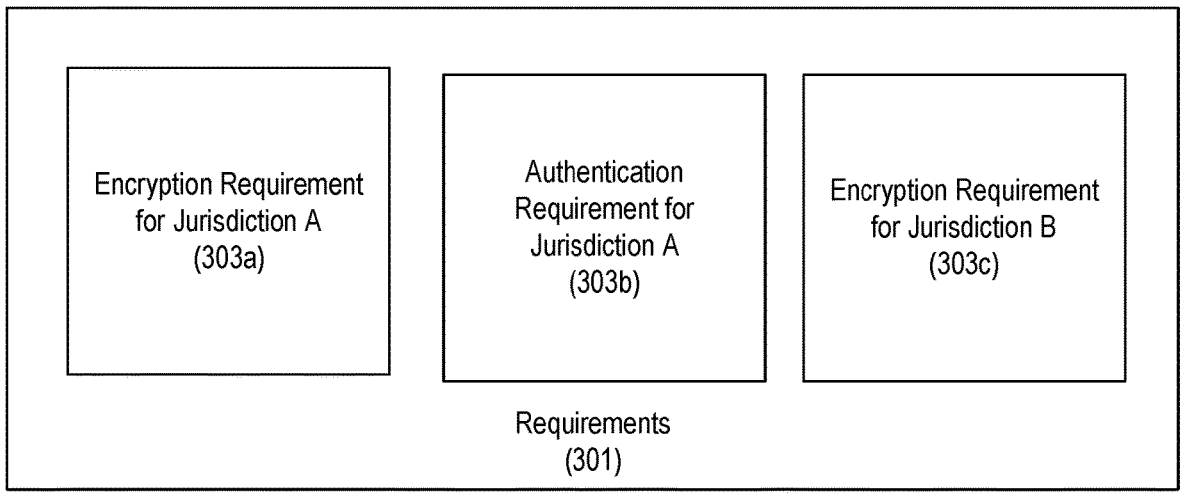
FIG. 3 depicts requirements for one or more devices and a current configuration of the one or more devices in accordance with one or more aspects described herein.
Figure 3:
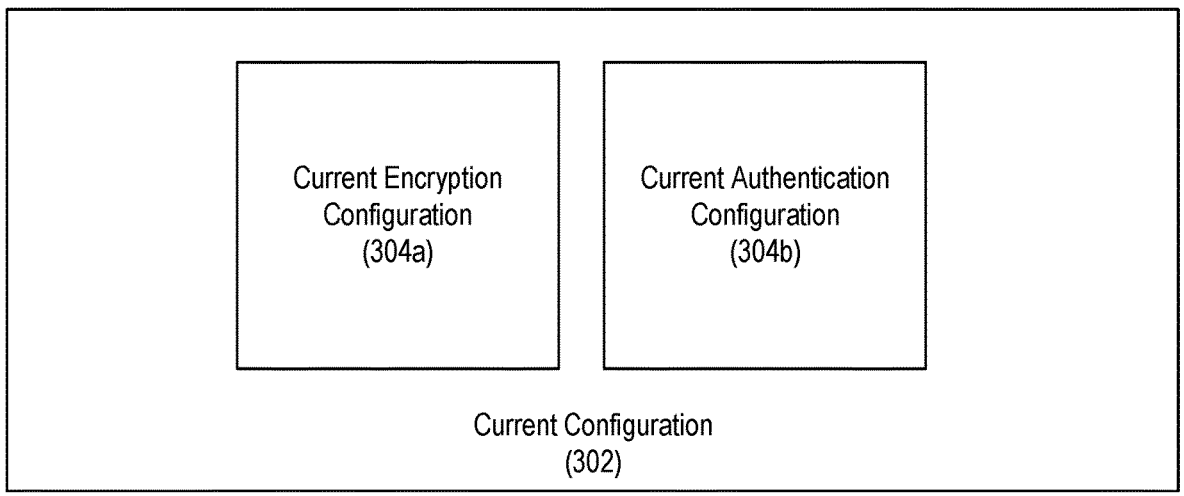

FIG. 3 shows a block diagram 300 representing different requirements across multiple jurisdictions and a current configuration of one or more devices. Requirements 301 may correspond to restrictions imposed by one or more jurisdictions, such as an encryption requirement for jurisdiction A 303a, an authentication requirement for jurisdiction A 303b, and an encryption requirement for jurisdiction B 303c. Current configuration 302 may correspond to a current configuration of one or more devices, such as a current encryption configuration 304a and a current authentication configuration 304b.

The requirements 301 may comprise any restriction associated with an organization. The requirements 301 may be associated with processes of the organization, such as how one or more devices of the organization operate. The requirements 301 may relate to the operations of one or more individuals in the organization, one or more devices in the organization, or the like. For example, the requirements 301 may correspond to requirements over how data is encrypted (as denoted by the encryption requirement for jurisdiction A 303a and the encryption requirement for jurisdiction B 303c), how one or more users are to be authenticated (as denoted by the authentication requirement for jurisdiction A 303b), rules relating to how the organization may operate with respect to the devices, or the like. The requirements 301 may originate from governing bodies, such as a government of a jurisdiction, such that the requirements 301 may be in the form of laws, guidances, or the like. Additionally and/or alternatively, the requirements 301 may correspond to one or more agreements and/or contracts made by an organization. For example, the requirements 301 may comprise restrictions associated with a contract between an organization and its customers. As another example, the requirements 301 may comprise restrictions associated with a standard, such as a standard governing data security, payment processing, data processing, or the like. The requirements 301 may be represented in a text format, such as a narrative, a list, or the like. For example, the requirements 301 may comprise a sentence that says "Server A must use two-factor authentication and encrypt all data using the MD5 hash algorithm when working with customers in Florida, but need not use an encryption algorithm when working with customers in New York."

The current configuration 302 may be any configuration of an organization. The current configuration 302 may correspond with current processes of the organization, such as how the organization operates with respect to one or more individuals, devices, or the like. The current configuration 302 may correspond to a general description of how the organization operates in a particular market, region, or the like. The current configuration 302 may indicate, for example, how the one or more devices associated with the organization encrypt data (as denoted by the current encryption configuration 304a), how the one or more devices authenticate users (as denoted by the current authentication configuration 304b), or the like. The current configuration 302 may be represented in text, such as in a textual narrative, a list, or the like. For example, the current configuration 302 may comprise a sentence that says "Server A requires that users use two-factor authentication and encrypts all data received or sent using the MD5 hash algorithm." The current configuration 302 may be collected by one or more databases by querying the one or more devices. Additionally and/or alternatively, the current configuration 302 may comprise a manually written description of the one or more devices, such as an instruction manual corresponding to the one or more devices.

The one or more devices of the organization may be one or more computing devices, such as servers, payment processing devices, employee computing devices (e.g., company-issued smartphones, laptops, or the like), and other similar devices. The one or more devices need not be the same or similar. In turn, the one or more devices need not be owned by the organization, but may merely be associated with the organization. For example, the one or more devices may include personal devices used by individuals on a network managed by the organization.

The requirements 301 and the current configuration 302 may be text, but need not be in any particular data format. For example, the requirements 301 may be in a structured data format, whereas the current configuration 302 may be in an unstructured data format. As another example, the requirements 301 may comprise a plurality of different text files, each corresponding to a different restriction, law, or the like, whereas the current configuration 302 may comprise a plurality of web pages indicating a current configuration of the one or more devices.

The requirements 301 and the current configuration 302 may differ in a variety of ways. The requirements 301 may be periodically updated (e.g., by a jurisdictional government), and those periodic updates may change the requirements 301 such that the requirements 301 may, over time, differ from the current configuration 302 (even if the one or more devices were previously in compliance with the requirements 301). Moreover, the requirements 301 may differ for different jurisdictions. In particular, as shown in FIG. 3, there are two different encryption requirements (the encryption requirement for jurisdiction A 303a and the encryption requirement for jurisdiction B 303c), and these encryption requirements may themselves be contradictory (such that, for example, the encryption requirement for jurisdiction A 303a may require an encryption algorithm that cannot be performed along with a different encryption algorithm required by the encryption requirement for jurisdiction B 303c). The differences between the requirements 301 and the current configuration 302 may require reconfiguration of the one or more devices associated with an organization. For example, if the encryption requirement for jurisdiction A 303a requires encryption, and if, per the current encryption configuration 304a, the one or more devices do not perform any form of encryption, then the one or more devices may need to be reconfigured to perform such encryption. In some cases, the differences might not require reconfiguration of the one or more devices. For example, if the encryption requirement for jurisdiction B 303c indicates that encryption is not required, but the current encryption configuration 304a indicates that the one or more devices perform encryption steps, the one or more devices need not be reconfigured.

Figure 4:
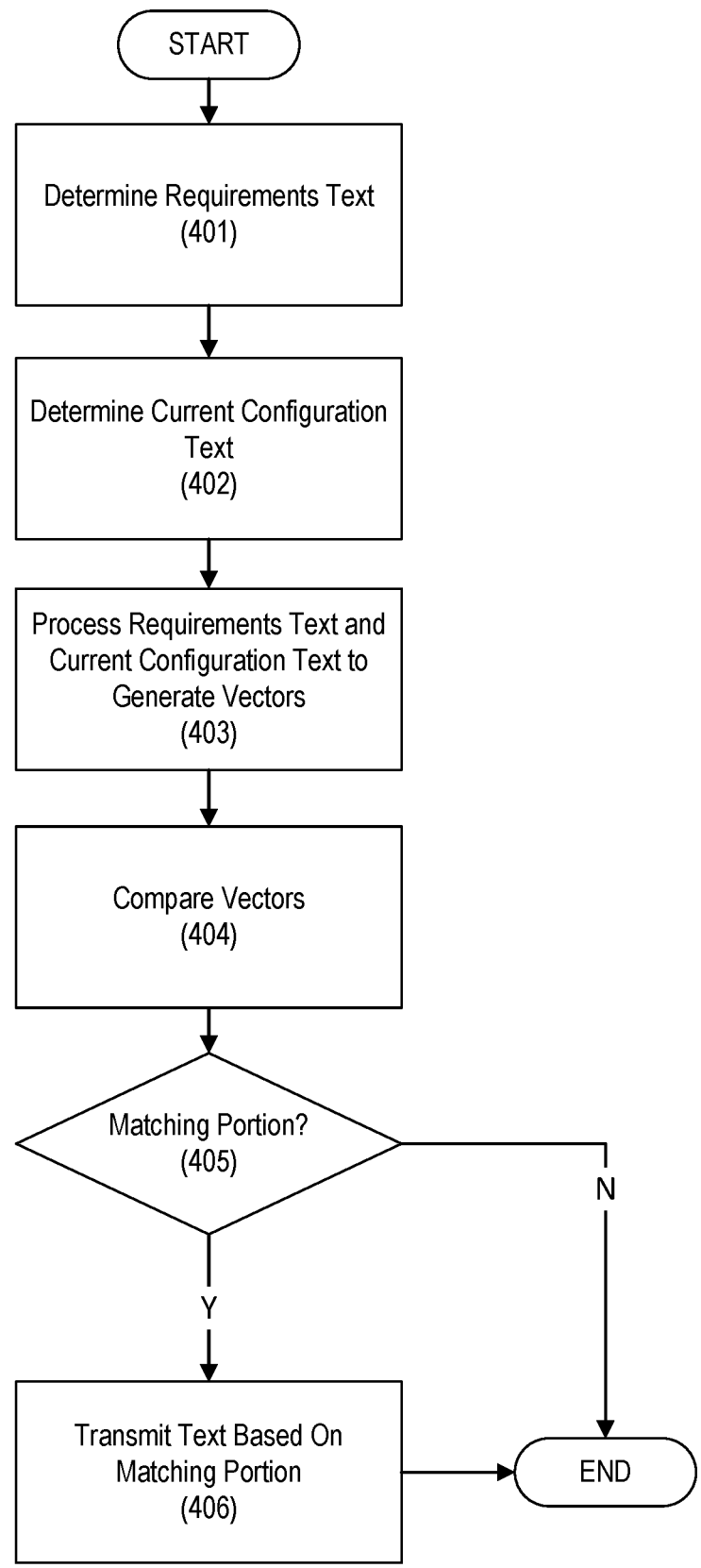
FIG. 4 depicts a flow chart representing how a computing device may analyze requirements text and current configuration text in accordance with one or more aspects described herein.

FIG. 4 is a flow chart 400 which may be performed by one or more computing devices to compare requirements text and current configuration text. The one or more computing devices that perform the steps depicted in FIG. 4 may be, for example, the computing device 200 depicted in FIG. 2.

In step 401, requirements text may be determined. The requirements text may be the same or similar as the requirements 301. The requirements text may be received via one or more external sources, such as an external or internal database. As discussed above, the requirements text may be a collection of various descriptions, contracts, laws, or the like.

In step 402, current configuration text may be determined. The current configuration text may be the same or similar as the current configuration 302. The current configuration text may be received via one or more external sources, such as an external or internal database. The current configuration text may be a description of the current configuration of one or more devices associated with an organization. Determining the current configuration text may comprise polling the one or more devices for their current configuration and/or retrieving, from one or more sources, indications of the configuration of the one or more devices. The current configuration text may additionally and/or alternatively comprise a structured or unstructured textual description of the one or more devices, such as a paragraph describing, in plain English, the configuration of the server. The current configuration text may be determined using a manual or other instructional data associated with the one or more devices.

In step 403, the requirements text may be processed to generate a first vector, and the current configuration text may be processed to generate a second vector. This process will be described in more detail below with respect to FIG. 5.

In step 404, the vectors generated in step 404 may be compared. The first vector (corresponding to the requirements text) and the second vector (corresponding to the current configuration text) may be compared to determine a third vector which indicates which terms are and are not shared between the requirements text and the current configuration text. An example comparison and generation of a third vector is detailed below with respect to FIG. 6.

As an example of the above steps, the requirements text may comprise the sentence "A server must encrypt all data using MD5," and the current configuration text may comprise the sentence "Server A encrypts all data using MD5." The comparison in step 404 may result in a vector which indicates that the terms "all data," "encrypt[ ]," and "MD5"

are shared between the two sentences. As will be described further below with respect to FIG. 5, other terms (e.g., "A," "must," "using") might be ignored for the purposes of this comparison because of their low probative value.

In step 405, it is determined whether, based on the comparison, at least a portion of the vectors match. If so, the flow chart proceeds to step 406. If not, the flow chart ends. This determination may be based on a number of elements of the vectors matching. For example, if four or fewer elements match between the two vectors, the answer may be no, and the flow chart may end. In contrast, if five or greater elements match, the answer may be yes, and the flow chart may proceed to step 406. Such a threshold may be periodically updated based on the quality of results from the process shown in FIG. 4. For example, if the results generated in step 406 (discussed below) are regularly found to be unhelpful to a user, the threshold may be raised to six or greater.

In step 406, text may be transmitted based on the portion of the vectors that match. Text may be generated based on the matching portion of the vectors, and that text may be transmitted to a computing device. The generated text may comprise, for example, an indication of whether the current configuration text appears to indicate compliance with the requirements text. As part of generating the text, the portion of the vectors that match may be analyzed to determine whether the current configuration of one or more devices of an organization are contrary to one or more requirements associated with the requirements text. For example, the generated text may indicate that the one or more devices are in compliance with the requirements text. As another example, the generated text may indicate that the one or more devices are out of compliance with the requirements text.

The text may comprise an instruction configured to cause the one or more devices to be reconfigured to comply with the requirements text. For example, based on determining that the one or more devices are out of compliance because they use an older form of an encryption algorithm, the transmitted text may comprise an instruction configured to cause the one or more devices to download and use a newer form of the encryption algorithm. Such an instruction may be generated based on a database of instructions which may be transmitted to the one or more devices associated with the organization. Additionally and/or alternatively, the instruction may be transmitted to an administrator, informing the administrator that the device should be reconfigured.

The text may be displayed in a user interface in a manner which may detail a difference between current device configurations and the requirements text. For example, text may be generated indicating, term-by-term, differences in the requirements text and the current conditions text.

The process depicted in FIG. 4 may be performed in response to detecting a change in one or more restrictions contained in the requirements text. The requirements text may be periodically updated (e.g., to add a new restriction, to modify an existing restriction, to remove an outdated restriction), and the process in FIG. 4 may be initiated in response to receiving an indication of such an update. For example, an external server may receive an indication of a new restriction on data security and, in response, transmit an indication to a computing device. That recipient computing device may, based on receiving that indication, begin the process depicted in FIG. 4.

Figure 5:
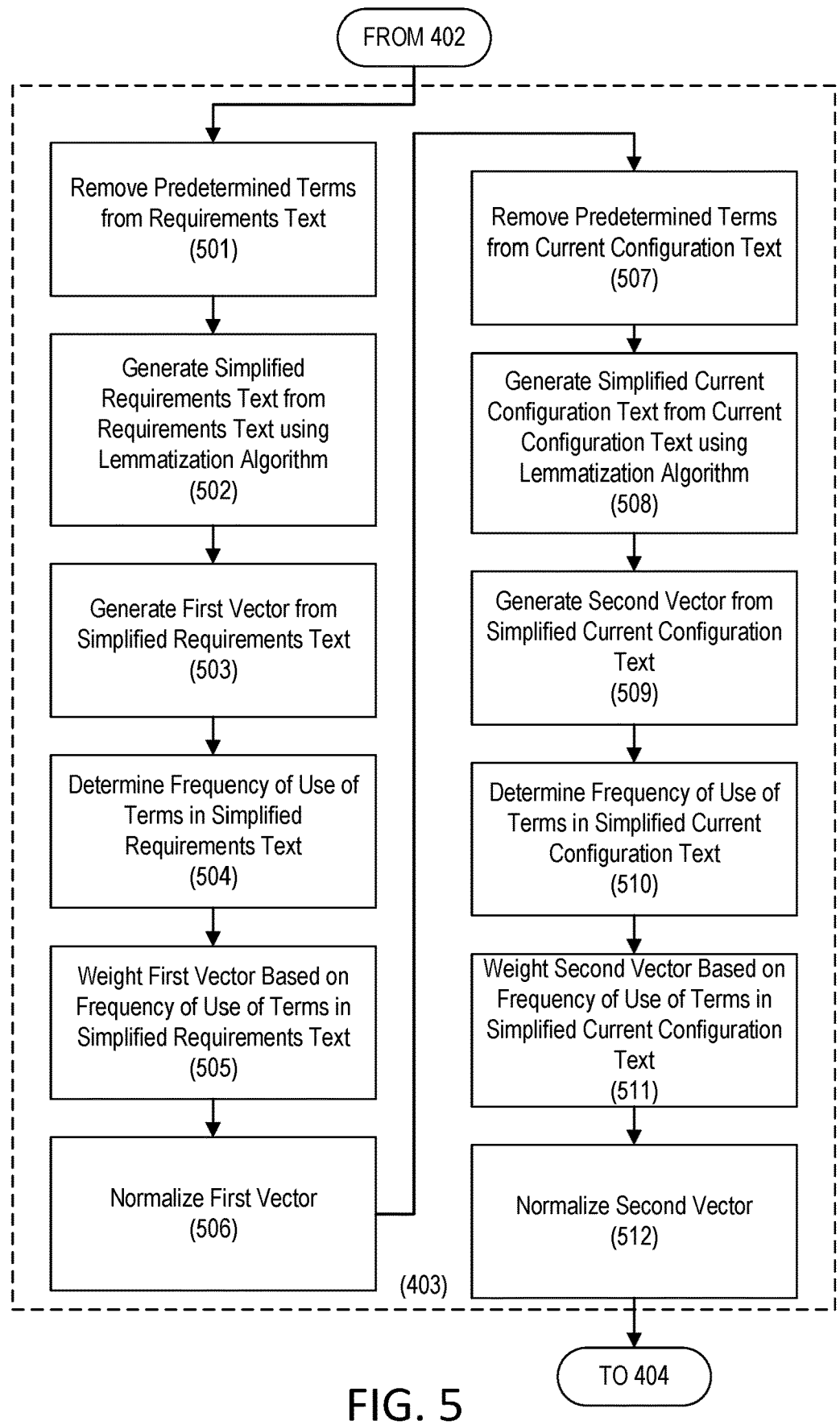
FIG. 5 depicts a flow chart that is a portion of FIG. 4 and details how the computing device may process the requirements text and the current configuration text to generate vectors in accordance with one or more aspects described herein.

FIG. 5 is a flow chart which may be performed by one or more computing devices as part of step 403 of FIG. 4. As shown in FIG. 5, FIG. 4 may comprise all or portions of step 403 of FIG. 4, and may begin after step 402 and before step 404. Thus, FIG. 5 begins after step 402 of FIG. 4. The steps depicted in FIG. 5 may be rearranged as desired. For example, steps 507-512 may be performed before steps 501-506.

In step 501, the requirements text may be processed by removing one or more predetermined terms from the requirements text. The predetermined terms may be any terms that might be unhelpful for the purposes of determining how the requirements text applies to one or more devices of the organization. For example, legal terms (e.g., "article," "heading," "chapter") may be removed because such terms have little bearing on the one or more devices of the organization. As another example, stop words may be removed. As yet another example, non-substantive terms (e.g., "in other words") may be removed. In general, this process may be performed in a manner which removes terms which are of little value in determining whether the requirements text applies to the current configuration of one or more devices of the organization. The predetermined terms may additionally and/or alternatively comprise terms specific to the organization (e.g., the name of the organization, the names of employees of the organization), which may be of relatively little use for determining the compliance of one or more devices of the organization. For example, the identity of a signatory of a contract is unlikely to be important from the perspective of determining whether a server complies with data security requirements.

Step 501 may additionally and/or alternatively involve a string cleaning function. As the requirements text may originate from a variety of different sources, various textual differences may be present: some portions of the requirements text may use double spaces, whereas other portions of the requirements text may use single spaces, etc. Step 501 may comprise eliminating such differences by, e.g., replacing extra spaces, removing new lines and/or carriage returns, removing and/or replacing punctuation, or the like. This string cleaning function may additionally and/or alternatively be used to sanitize input (e.g., remove portions of the requirements text associated with computer code), such that attempts to inject code in the requirements text may be thwarted.

In step 502, simplified requirements text may be generated based on the non-removed portion of the requirements text and using a lemmatization algorithm. A lemmatization algorithm may be any algorithm which simplifies and/or groups words based on their meaning. As an example, a lemmatization algorithm may combine the words "store," "hold," "maintain," "preserve," and the like into a single term, such as "store." In this way, linguistic variance in language may be avoided. The simplified text may not be as easy to read as the requirements text, but may nonetheless be more easily parsed by one or more computing devices. For example, the simplified text "Server A must store and maintain first data and must maintain second data" may be simplified to "Server A store first data. Server A store second data." All or portions of the lemmatization algorithm may involve removing one or more characters from a word such that, for example, words such as "storing" or "stored" are simplified into "store" (or an even more reduced root such as, e.g., "stor").

In step 503, a first vector may be generated based on the simplified text. The first vector may be binary and indicate the presence or absence of a term. For example, the vector may comprise a plurality of elements, each indicating the presence of a word in the simplified text. The presence of a term in the binary vector may be represented by a "1," whereas the absence of a term in the binary vector may be represented by a "0."

In step 504, a frequency of use of terms in the simplified requirements text may be determined. The frequency of use may be determined by simply counting the number of terms that appear in the simplified text.

In step 505, the first vector may be weighted based on a frequency of use of terms in the simplified requirements text. This process may entail weighting the first vector based on the term frequency-inverse document frequency (TFIDF) method, wherein each element in the vector may be inversely weighted based on the frequency of use of a corresponding term in the requirements text, thereby causing less frequently used terms to be weighted more highly than more frequency used terms. This inverse weighting advantageously weights relatively more unique terms more highly than relatively more common terms, as such terms might be relatively more important from a requirements standpoint. For example, while the term "server" might be used frequently in requirements text relating to data security, the term "MD5 encryption algorithm" might be less frequently used and thereby more important for matching.

As used herein, term may refer to one or more characters (e.g., one or more words), but need not refer to an entire word or phrase. A phrase may comprise multiple terms, but a term need not be limited to single words. For example, a first term may be "store no more than" and a second term may be "five hundred gigabytes," such that a phrase may be the first and second terms ("store no more than five hundred gigabytes"). A term may be the root of multiple words (e.g., "stor" for "store," "storing," "stored," etc.).

In step 506, the first vector may be normalized based on semantic analysis of the first vector. Even with the removal of predetermined terms (in step 501) and the lemmatization (in step 502), the first vector may comprise terms that have relatively less bearing on the applicability of the requirements text to the current configuration of the one or more devices. By performing one or more semantic analysis algorithms on the simplified text, all or portions of the first vector may be normalized. For example, the English term "computer configuration" might be used by the requirements text when discussing how a computer should be configured; however, the requirements-related implications of that term might be relatively low, particularly where the entirety of the requirements text relates to how computers should be configured. The semantic analysis may comprise removing one or more elements of the first vector. For example, a semantic analysis algorithm may determine that the utility of a given term is low, and the semantic analysis algorithm may cause removal of an element corresponding to that term from a vector. The semantic analysis performed in step 506 may advantageously reduce the dimensionality of the first vector.

The weighting and normalization performed in steps 505 and 506 may turn a binary vector into a non-binary vector. For example, the first vector generated in step 504 may comprise, for each element corresponding to a different term, a value of "0" or "1," indicating whether a term is not or is present in the requirements text. The weighting and normalization performed in steps 505 and 506 may modify such binary values. For example, the binary values may be modified to values from zero to ten, with a value of one indicating a term that is present in the requirements text but of low association with the configuration of one or more devices, a value of ten indicating a term that is present in the requirements text and of high association with the configuration of the one or more devices, and a value of zero indicating that the term is not present.

Steps 507-512 may be the same or similar as steps 501-506, albeit with respect to the current configuration text, rather than the requirements text. One reason for processing the current configuration text in a manner similar to the requirements text may be to make the two resultant vectors as similar as possible. That said, because the current configuration text may be stored internally (and not originate from outside sources, like the requirements text), processing of the current configuration text might be in some ways different than the requirements text.

In step 507, the current configuration text may be processed by removing one or more predetermined terms from the current configuration text. The predetermined terms may be the same or similar used with respect to step 501.

In step 508, simplified current configuration text may be generated based on the non-removed portion of the current configuration text and using the lemmatization algorithm described with respect to step 502.

In step 509, a second vector may be generated based on the simplified current configuration text. The second vector may be similar in format or organization as the first vector, such that comparison of the first vector and the second vector may be made more computationally straightforward. For example, the second vector generated in step 509, like the first vector generated in step 503, may be a binary vector indicating the presence or absence of one or more terms.

In step 510, a second frequency of use of terms in the simplified current configuration text may be determined. Then, in step 511, the second vector may be weighted based on the second frequency of use of terms in the simplified current configuration text. As with step 504, the inverse frequency of the terms in the simplified current configuration text may be used in step 511.

In step 512, the second vector may be normalized based on a semantic analysis of the second vector. The normalization performed in step 512 may be based, at least in part, on the normalization performed in step 506. For example, if one or more words are highly discounted or removed in step 506, the same terms may be highly discounted or removed in step 512.

After step 512, the flow chart may proceed to step 404 of FIG. 4.

Figure 6:
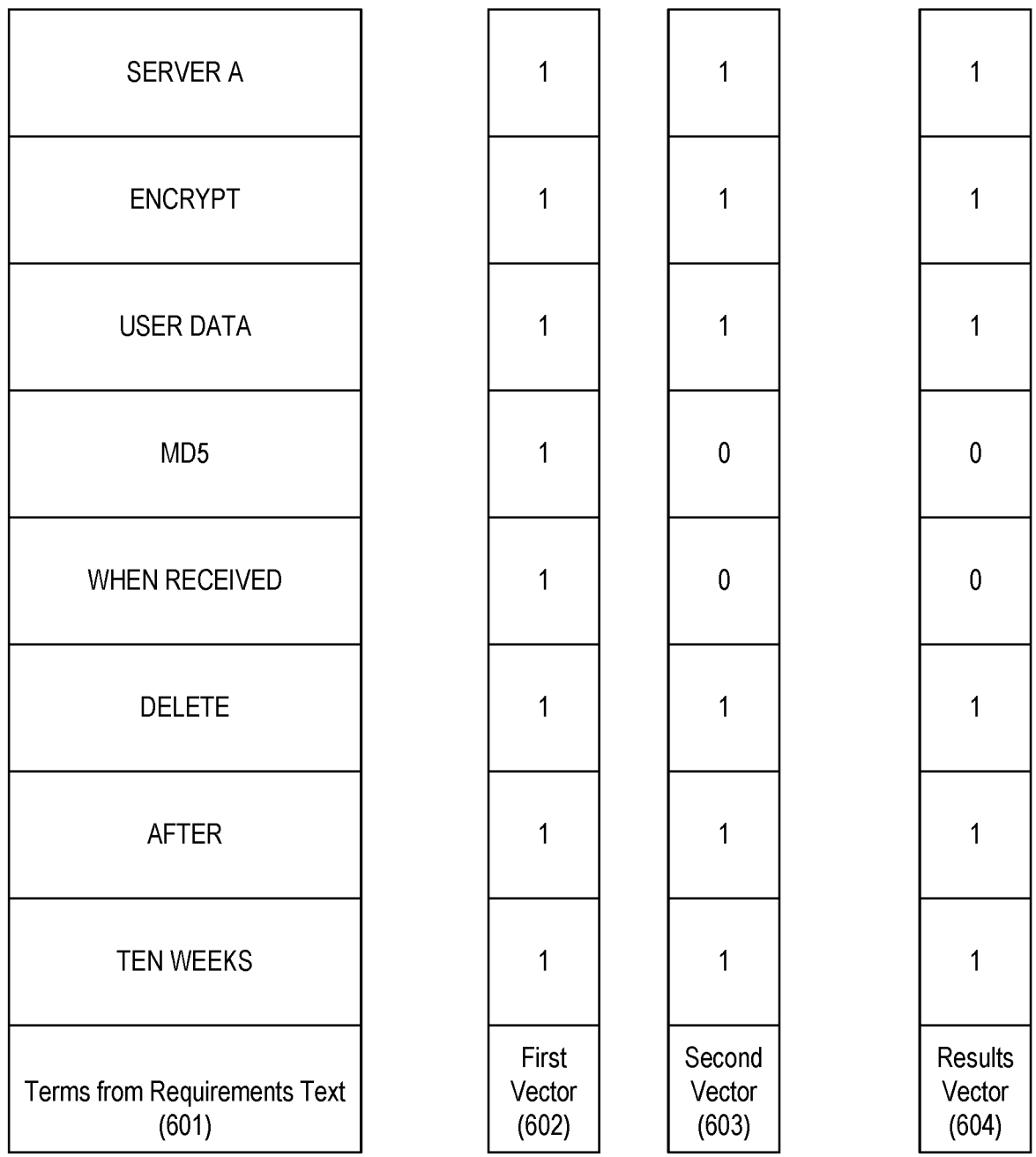
FIG. 6 depicts how terms from requirements text may be translated into a first vector and compared against a second vector to generate a third results vector in accordance with one or more aspects described herein.

FIG. 6 depicts how terms from requirements text may be translated into a first vector (corresponding to the requirements text) and compared against a second vector (corresponding to current device configurations) to generate a third results vector (indicating which elements are shared). For the purposes of example, in FIG. 6, the terms from the requirements text 601 are "SERVER A," "ENCRYPT," "USER DATA," "MD5," "WHEN RECEIVED," "DELETE," "AFTER," and "TEN WEEKS." These are translated (through the processes depicted in FIG. 5) into a first vector 602 which, for the same of simplicity, only corresponds to the terms from the requirements text 601, such that all values are "1" (true). Second vector 603, in contrast, indicates that the terms "MD5" and "WHEN RECEIVED" are not present, such that elements corresponding to those terms have a value of "0" (not true), with all other elements having a value of "1" (true). This may be because, for example, the one or more devices in question do in fact encrypt user data, but do not do so when received, and/or do not do so using MD5. In turn, results vector 604 indicates that "SERVER A," "ENCRYPT, "USER DATA," "DELETE," "AFTER," and "TEN WEEKS" are present (as the elements have a value of "1"), whereas "MD5" and "WHEN RECEIVED" are not (as the elements have a value of "0"). The results vector 604 may be used to generate text, such as a plain language sentence (e.g., "Server A is out of compliance in that it encrypts user data, but does not do so when received and with the MD5 encryption algorithm. Server A is in compliance with the requirement that it deletes user data after ten weeks."). Such text may be used to generate an instruction. For example, the instruction may cause Server A to begin to encrypt user data when received using the MD5 encryption algorithm, putting it in compliance with the requirements text.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. An apparatus comprising:
one or more processors; and
memory storing instructions that, when executed by the one or more processors, cause the apparatus to:
receive, from at least one external database, requirements data comprising first text that indicates a plurality of restrictions associated with one or more processes of an organization;
determine second text indicating a configuration of the organization by receiving, for each of a plurality of different computing devices, text of a corresponding instruction manual that describes a configuration of a corresponding computing device;
generate, based on the first text, a first vector;
generate, based on the second text, a second vector;
determine, based on comparing first elements of the first vector and second elements of the second vector, a portion of the second vector corresponding to the first vector;
generate, based on the portion of the second vector corresponding to the first vector, third text comprising instructions for modifying the configuration for at least one of the plurality of different computing devices; and
modify, based on the third text and based on a quantity of elements of the portion of the second vector satisfying a threshold, the configuration for at least one of the plurality of different computing devices by transmitting, to the at least one of the plurality of different computing devices, instructions configured to cause the at least one of the plurality of different computing devices to modify a configuration parameter.

2. The apparatus of claim 1, wherein the configuration of the organization comprises an authentication configuration of the organization, and wherein the instructions, when executed by the one or more processors, cause the apparatus to modify the configuration for the at least one of the plurality of different computing devices by causing the apparatus to modify an authentication configuration of the at least one of the plurality of different computing devices.

3. The apparatus of claim 1, wherein the configuration of the organization comprises an encryption configuration of the organization, and wherein the instructions, when executed by the one or more processors, cause the apparatus to modify the configuration for the at least one of the plurality of different computing devices by causing the apparatus to modify an encryption configuration of the at least one of the plurality of different computing devices.

4. The apparatus of claim 1, wherein the configuration of the organization comprises a data processing configuration of the organization, and wherein the instructions, when executed by the one or more processors, cause the apparatus to modify the configuration for the at least one of the plurality of different computing devices by causing the apparatus to modify a data processing configuration of the at least one of the plurality of different computing devices.

5. The apparatus of claim 1, wherein the instructions, when executed by the one or more processors, cause the apparatus to transmit the instructions by:
transmitting, to the at least one of the plurality of different computing devices, data regarding compliance with at least one of the plurality of restrictions.

6. The apparatus of claim 1, wherein the instructions, when executed by the one or more processors, cause the apparatus to transmit the instructions by:
transmitting, to the at least one of the plurality of different computing devices, an indication that the at least one of the plurality of different computing devices is out of compliance.

7. The apparatus of claim 1, wherein the instructions, when executed by the one or more processors, cause the apparatus to compare the first elements of the first vector and second elements of the second vector by generating a third vector, wherein each element of the third vector indicates a presence or absence of a different term.

8. A method comprising:
    receiving, from at least one external database, requirements data comprising first text that indicates a plurality of restrictions associated with one or more processes of an organization;
    determining second text indicating a configuration of the organization by receiving, for each of a plurality of different computing devices, text of a corresponding instruction manual that describes a configuration of a corresponding computing device;
    generating, based on the first text, a first vector;
    generating, based on the second text, a second vector;
    determining, based on comparing first elements of the first vector and second elements of the second vector, a portion of the second vector corresponding to the first vector;
    generating, based on the portion of the second vector corresponding to the first vector, third text comprising instructions for modifying the configuration for at least one of the plurality of different computing devices; and
    modifying, based on the third text and based on a quantity of elements of the portion of the second vector satisfying a threshold, the configuration for at least one of the plurality of different computing devices by transmitting, to the at least one of the plurality of different computing devices, instructions configured to cause the at least one of the plurality of different computing devices to modify a configuration parameter.

9. The method of claim 8, wherein the configuration of the organization comprises an authentication configuration of the organization, and wherein modifying the configuration for the at least one of the plurality of different computing devices comprises modifying an authentication configuration of the at least one of the plurality of different computing devices.

10. The method of claim 8, wherein the configuration of the organization comprises an encryption configuration of the organization, and wherein modifying the configuration for the at least one of the plurality of different computing devices comprises modifying an encryption configuration of the at least one of the plurality of different computing devices.

11. The method of claim 8, wherein the configuration of the organization comprises a data processing configuration of the organization, and wherein modifying the configuration for the at least one of the plurality of different computing devices comprises modifying a data processing configuration of the at least one of the plurality of different computing devices.

12. The method of claim 8, wherein the transmitting the instructions comprises:
    transmitting, to the at least one of the plurality of different computing devices, data regarding compliance with at least one of the plurality of restrictions.

13. The method of claim 8, wherein transmitting the instruction comprises:
    transmitting, to the at least one of the plurality of different computing devices, an indication that the at least one of the plurality of different computing devices is out of compliance.

14. The method of claim 8, wherein comparing the first elements of the first vector and second elements of the second vector comprises generating a third vector, wherein each element of the third vector indicates a presence or absence of a different term.

15. One or more non-transitory computer-readable media storing instructions that, when executed by one or more processors of an apparatus, cause the apparatus to:
    receive, from at least one external database, requirements data comprising first text that indicates a plurality of restrictions associated with one or more processes of an organization;
    determine second text indicating a configuration of the organization by receiving, for each of a plurality of different computing devices, text of a corresponding instruction manual that describes a configuration of a corresponding computing device;
    generate, based on the first text, a first vector;
    generate, based on the second text, a second vector;
    determine, based on comparing first elements of the first vector and second elements of the second vector, a portion of the second vector corresponding to the first vector;
    generate, based on the portion of the second vector corresponding to the first vector, third text comprising instructions for modifying the configuration for at least one of the plurality of different computing devices; and
    modify, based on the third text and based on a quantity of elements of the portion of the second vector satisfying a threshold, the configuration for at least one of the plurality of different computing devices by transmitting, to the at least one of the plurality of different computing devices, instructions configured to cause the at least one of the plurality of different computing devices to modify a configuration parameter.

16. The one or more non-transitory computer-readable media of claim 15, wherein the configuration of the organization comprises an authentication configuration of the organization, and wherein the instructions, when executed by the one or more processors, cause the apparatus to modify the configuration for the at least one of the plurality of different computing devices by causing the apparatus to modify an authentication configuration of the at least one of the plurality of different computing devices.

17. The one or more non-transitory computer-readable media of claim 15, wherein the configuration of the organization comprises an encryption configuration of the organization, and wherein the instructions, when executed by the one or more processors, cause the apparatus to modify the configuration for the at least one of the plurality of different computing devices by causing the apparatus to modify an encryption configuration of the at least one of the plurality of different computing devices.

18. The one or more non-transitory computer-readable media of claim 15, wherein the configuration of the organization comprises a data processing configuration of the organization, and wherein the instructions, when executed by the one or more processors, cause the apparatus to modify the configuration for the at least one of the plurality of different computing devices by causing the apparatus to modify a data processing configuration of the at least one of the plurality of different computing devices.

19. The one or more non-transitory computer-readable media of claim 15, wherein the instructions, when executed by the one or more processors, cause the apparatus to transmit the instructions by:
    transmitting, to the at least one of the plurality of different computing devices, data regarding compliance with at least one of the plurality of restrictions.

20. The one or more non-transitory computer-readable media of claim 15, wherein the instructions, when executed by the one or more processors, cause the apparatus to transmit the instructions by:

transmitting, to the at least one of the plurality of different computing devices, an indication that the at least one of the plurality of different computing devices is out of compliance.

\* \* \* \* \*